United States Patent [19]

Tubesing, deceased et al.

[11] Patent Number: 4,620,367
[45] Date of Patent: Nov. 4, 1986

[54] SAW DRIVE TENSIONER

[76] Inventors: William W. Tubesing, deceased, late of Stone Mountain; by Charlotte M. Tubesing, executrix, 1097 Sharonton Way, Stone Mountain, both of Ga. 30083

[21] Appl. No.: 710,393
[22] Filed: Mar. 11, 1985
[51] Int. Cl.⁴ .................. B27B 9/00; B24B 23/02; B28D 1/04
[52] U.S. Cl. .................................... 30/122; 30/388; 51/170 PT; 474/33
[58] Field of Search .............. 30/388, 122; 474/33, 474/39; 125/13 R; 51/170 PT

[56] References Cited

U.S. PATENT DOCUMENTS

| | | | |
|---|---|---|---|
| 281,409 | 10/1857 | Ibelle | 30/122 |
| 1,287,707 | 12/1918 | Leary | 474/33 |
| 2,201,600 | 5/1940 | Waltz | 474/33 |
| 2,732,831 | 1/1956 | Dodge | 474/33 X |
| 2,815,050 | 12/1957 | Haug | 30/388 |
| 3,711,946 | 1/1973 | Troutman | 30/388 |
| 4,188,935 | 12/1980 | Tubesing | 30/122 |

Primary Examiner—Jimmy C. Peters
Attorney, Agent, or Firm—B. J. Powell

[57] ABSTRACT

A saw construction including a prime mover with a rotary output member, support means rotatably mounting a cutting blade on the prime mover, a first flexible endless drive member drivingly connecting the output member to a transfer member and a second flexible endless drive member drivingly connecting the transfer member to the cutting blade, and tensioning means for simultaneously adjusting the tension in both the first and second endless drive members.

8 Claims, 3 Drawing Figures

SAW DRIVE TENSIONER

BACKGROUND OF THE INVENTION

This invention relates generally to portable manually held saws and more particularly to a drive tensioner for applying tension to the flexible means drive members for such lightweight portable saws.

Lightweight portable saws which have an engine that drives a saw blade have gained widespread use in a number of applications. One such type saw uses a reinforced circular abrasive type blade which can cut concrete, metal and other materials. The circular blade is drivingly connected to the engine through a belt or chain drive to rotate same. The circular blades must be rotated within a given speed range in order to get the blade to cut properly and not be damaged. Because of space requirements, the speed variation that can be achieved between that of the engine and that of the cutting blade is limited. This has created manufacturing problems since it is frequently more economically feasible to obtain engines with dramatically different speeds to power the saw. Heretofore, attempts to match engine speed with circular saw blade speed has been difficult to achieve over a broad range.

SUMMARY OF THE INVENTION

These and other problems and disadvantages associated with the prior art are overcome by the invention disclosed herein by providing a saw drive assembly which permits the matching of saw blade speed and engine speed even when there is a dramatic difference in the rotational speed of each. The drive assembly includes a pair of endless flexible members which connect the output member on the engine with the driven member for the blade through an intermediate speed change member. This construction permits greater differences between the speed of the engine and the speed of the saw blade than with a single endless member drive. The drive assembly is constructed so that a single adjustment automatically adjusts the tension in both endless flexible drive members while at the same time insuring that the tension in both the drive members remains substantially the same.

The apparatus of the invention includes an attachment which rotatably supports the circular saw blade thereon and which is mounted on the prime mover of the saw. The mounting assembly includes a first elongate member adjustably mounted on the prime mover adjacent the output member of the prime mover. The first member rotatably mounts transfer member thereon so that it is aligned with the output member on the prime mover. A first endless flexible drive member connects the output member on the prime mover with the intermediate drive transfer member. Adjustably mounted on the first support member is a second support member which can be adjusted with respect to the first support member independently of the adjustment of the first support member relative to the prime mover. Mounted on the projecting end of the second support member is the blade support that rotatably mounts a shaft on which the saw blade is mounted for rotation therewith. The opposite end of the shaft mounts a driven member thereon engaged by the second flexible endless drive member. A positioning assembly connects the inboard end of the second support member to the prime mover so that the second support member can be moved relative to the prime mover independently of the first support member. This arrangement permits the single adjustment to tension both the first and second endless flexible drive members with a single adjustment and to also insure substantially equal tension in both of the flexible endless members.

These and other features and advantages of the invention will become more clearly understood upon consideration of the following description and accompanying drawings wherein like characters of reference designate corresponding parts throughout the several views and in which:

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Figure 1:
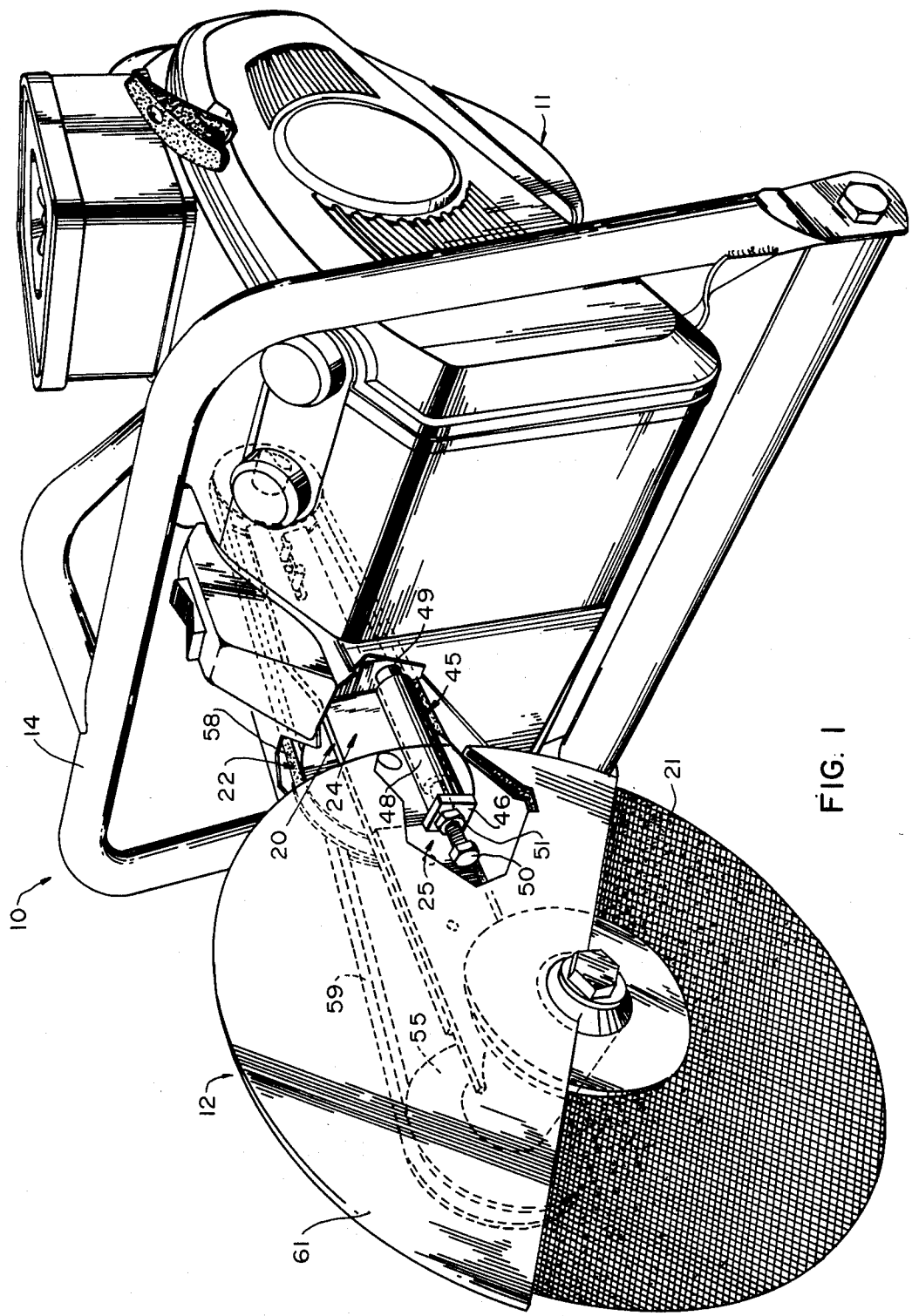
FIG. 1 is a perspective view illustrating the invention.
Figure 2:
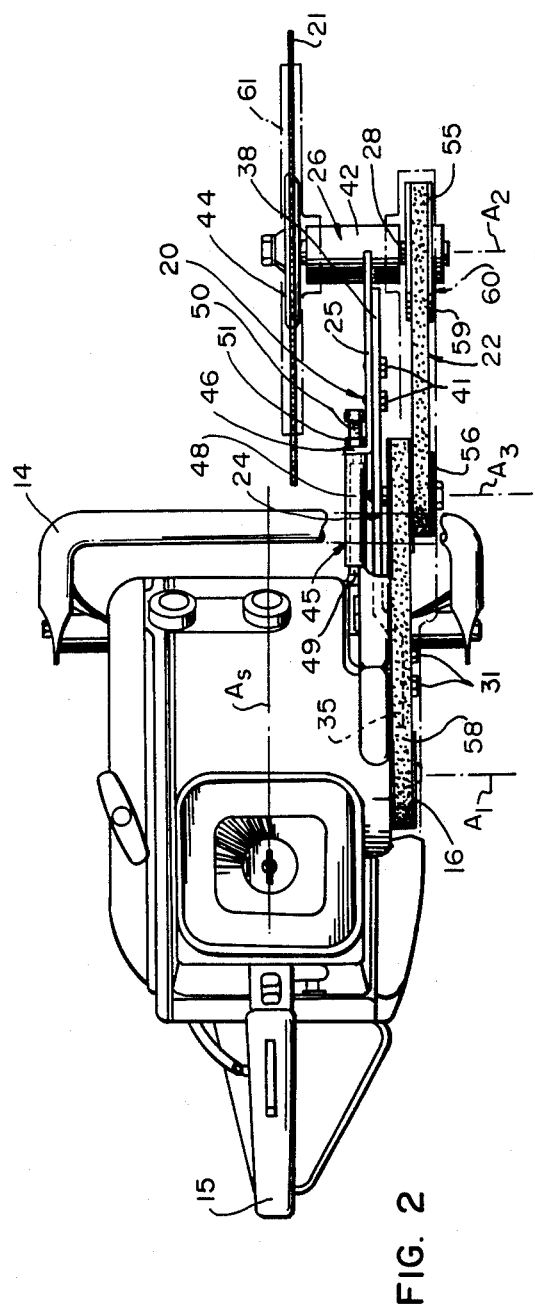
FIG. 2 is a top plan view thereof.
Figure 3:
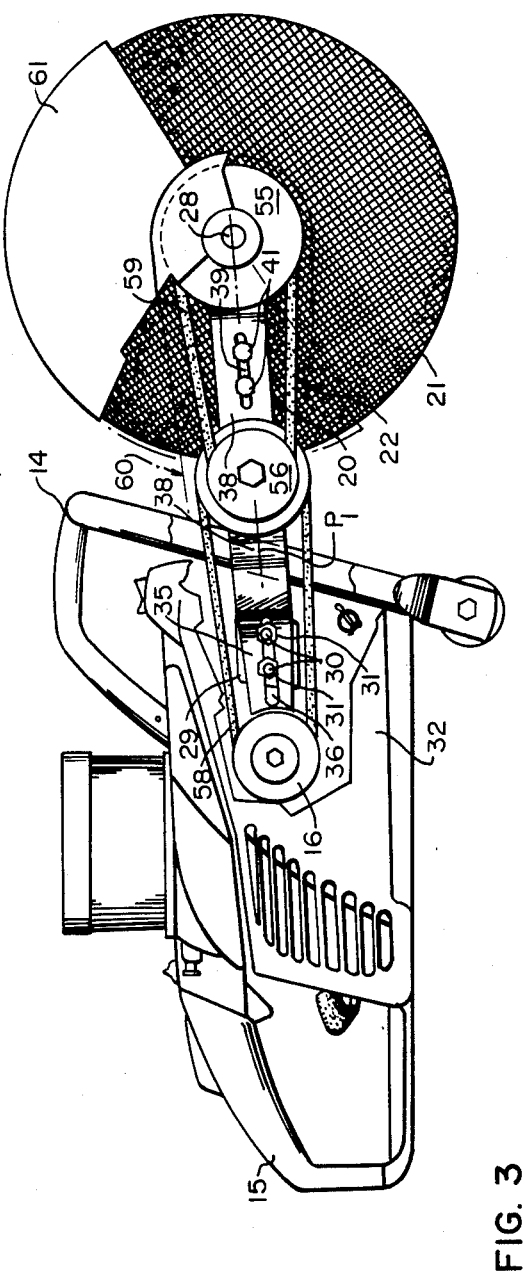
FIG. 3 is a side elevational view thereof.

FIG. 1 shows the invention incorporated in a lightweight portable saw 10 which has a prime mover 11 driving a cutting assembly 12. The saw 10 is typically equipped with front and rear handles 14 and 15 respectively to allow the saw to be manually held during use. The prime mover 11 is illustrated as an internal combustion engine with its drive shaft mounting an output member 16 thereon for rotation about an axis $A_1$ generally normal to the longitudinal axis $A_S$ of the saw 10. This is best seen in FIGS. 2 and 3. While the output member 16 is illustrated as a V-belt pulley, it will be understood that it can likewise be a chain sprocket or the like depending on the type of member it is to drivingly support.

The cutting assembly 12 includes support assembly 20 mounted on the prime mover 11 and projecting forwardly thereof to mount a circular reinforced abrasive cutting blade 21 about a blade axis $A_2$ generally parallel to the rotational axis $A_1$ of the output member 16 with the cutting blade 21 so that the prime mover 11 rotates the cutting blade 21. The support assembly 20 includes an inboard support beam 24 which is mounted on prime mover 11 and an outboard support beam 25 which is mounted on the inboard support beam 24. The projecting end of the outboard support beam 25 mounts a bearing assembly 26 thereon in which is mounted the support shaft 28 that mounts the cutting blade 21. Beams 24 and 25 are plate members oriented so that their major transverse width is perpendicular to the axes $A_1$ and $A_2$. This allows the beams 24 and 25 to be juxtaposed against each other as will become more apparent.

The prime mover 11 is provided with a support abuttment 29 adjacent the output member 16 which has a support surface thereon generally perpendicular to the axis $A_1$. The support abuttment 29 is provided with a pair of spaced apart mounting studs 30 which are oriented along a common path $P_1$ as seen in FIG. 3. Appropriate nuts 31 are provided for the studs 30. Typically, the support abuttment 29 is designed to cooperate with a similar support abuttment on the cover 32 partly seen in FIG. 3 where the studs 30 project through the cover 32 and the nuts 31 hold the cover 32 in place.

The inboard support beam 24 is provided with an offset section 35 at its inboard end which is adapted to lie against the support abuttment 29. The offset section 35 is provided with an elongate slot 36 which is oriented along the longitudinal axis of the inboard support beam 24 and is sized to just fit over the studs 30 on the prime mover 11. It will thus be seen that the offset section 35 of the inboard support beam 24 will be captivated between the cover 32 and the support abuttment 29 on the prime mover 11 when the nuts 31 are screwed onto the studs 30. It will further be noted that the slot 36 is longer than the distance between the studs 30 so that the inboard support beam 24 can be axially shifted relative to the output member 16 on the prime mover 11 along the path $P_1$. It will be appreciated that this locates the offset section 35 coplanar with the output member 16.

The main body portion 38 of the inboard support beam 24 is thus displaced laterally of the plane of the output member 16 as best seen in FIG. 2. The main body portion 38 defines an elongate slot 39 therein adjacent the projecting end of the main body portion 38 which is also aligned along the longitudinal axis of the inboard support beam 24. Thus, slot 39 is located along the common path $P_1$ when the inboard support beam 24 is mounted on the studs 30 on the prime mover 11 as best seen in FIG. 3.

The outboard support beam 25 is shorter than the main body portion 38 of the inboard support beam 24 and is provided with a pair of tapped holes intermediate its ends that are aligned with the longitudinal axis of the member 25. The spacing between these tapped holes is less than the length of the elongate slot 39 in the inboard support member 24 and a pair of bolts 41 are threadedly received therein. The bolts 41 extend through the slot 39 in the inboard support beam 24 with the bolt heads lying on the opposite side of the inboard support member 24 from the outboard support member 25. Thus, it will be seen that, as the bolts 41 are tightened, the outboard support member 25 will be clamppled against the main body portion 38 of the inboard support member 24. Likewise, when the bolts 41 are loosened, the outboard support beam 25 will still be supported on the inboard support member 24 but can be shifted axially of the path $P_1$ relative to the inboard support member 24.

The outboard end of the outboard support member 25 mounts the bearing assembly 26 thereon. The bearing assembly 26 includes a cross tube 42 in which is appropriately journalled the support shaft 28. The inwardly projecting end of the support shaft 28 is adapted to mount the cutting blade 21 thereon with a mounting attachment 44 while the outwardly projecting end of the support shaft 28 is drivingly connected to the output member 16 by the drive assembly 22.

The inboard end of the outboard support beam 25 is provided with a tension adjustment assembly 45 adapted to axially shift the outboard support beam 25 relative to the axis $A_1$ independently of the inboard support beam 24. The tension adjustment assembly 45 includes an inwardly projecting mounting tab 46 mounted on the inboard end of the outboard support beam 25 and oriented generally normal to the plane thereof. The mounting tab 46 mounts a support tube 48 thereon with its axis generally oriented parallel to the plane of the outboard support beam 25 and projecting inboard of the outboard support beam 25 toward the prime mover 11. A plunger 49 is slidably received in the support tube 48 and projects out of the inboard end thereof to engage a convenient surface on the prime mover 11. A positioning bolt 50 is threadedly mounted in the mounting tab 46 and projects into the support tube 48 to engage the plunger 49 and selectively extend the plunger 49 from the support tube 48. The positioning bolt 50 is provided with a lock nut 51 so that the positioning bolt 50 can be locked in position. It will thus be seen that, as the bolt 50 is screwed into mounting tab 46, the plunger 49 will be forced against the prime mover 11 to move the outboard support beam away from the prime mover 11.

Drive assembly 22 is illustrated as a belt and pulley arrangement, however, it will be understood that a chain and sprocket arrangement can be used in lieu thereof. The drive assembly 22 includes a driven member 55 mounted on the outer end of the support shaft 28 and rotatable therewith about the axis $A_2$. An intermediate transfer member 56 is rotatably mounted on the main body portion 38 of the inboard support beam 24 between the offset section 35 and the slot 39 so that the intermediate transfer member 56 is rotatable about a transfer axis $A_3$ parallel to the axes $A_1$ and $A_2$ and lying along the path $P_1$. An inboard endless drive member 58 drivingly connects the output member 16 on the prime mover 11 to the transfer member 56. An outboard endless drive member 59 drivingly connects the transfer member 56 to the driven member 55 so that the prime mover 11 drives the cutting blade 21 on the support shaft 28.

As mentioned above, the drive assembly 22 illustrated is a belt and pulley arrangement. The output member 16 on the prime mover 11 and the driven member 55 on the shaft 28 are single sheave pulleys while the transfer member 56 is a stepped double sheave pulley with the inner sheaf thereof coplanar with the output member 16 on the prime mover 11 while the outer sheave thereof is coplanar with the driven member 55 on the shaft 28. It will thus be seen that moving the inboard support beam 24 relative to the prime mover 11 serves to tension the inboard endless drive member 58 while movement of the outboard support beam 25 relative to the inboard support beam 24 serves to tension the outboard endless drive member 59. The construction of the tension adjustment assembly 45 is such that both the inboard and outboard endless drive members 58 and 59 can be simultaneously tensioned with the tension in the two drive members being substantially the same as will become more apparent.

To tension the drive members 58 and 59, the nuts 31 on studs 30 are loosened sufficiently for the inboard support beam 24 to slide on the studs 30. The bolts 41 interconnecting the inboard and outboard support beams 24 are 25 are loosened sufficiently for the bolts 41 to slide along slot 39 to permit the outboard support beam 25 to shift relative to the inboard support beam 24. The lock nut 51 on positioning bolt 50 is loosened so that bolt 50 can be manipulated.

Bolt 50 is then manipulated to force the plunger 49 out of the support tube 48 against the prime mover 11. This serves to first move the outboard support beam 25 away from the prime mover 11 independently of the inboard support beam 24. The outboard endless drive member 59, however, pulls the transfer member 56 therewith as it is moved away from the prime mover 11. This serves to move the transfer member 56 away from the prime mover 11 thereby moving the inboard support beam 24 therewith. This outward movement is limited by the inboard endless drive member 58 connecting the output member 16 and the transfer member 56. It will be appreciated that the movement of the transfer member 56 is such that the tension in both the outboard and inboard endless drive members remains substantially the same at all times. When the desired tension is achieved in the drive members 58 and 59, the lock nut 51 is retightened. Then the bolts 41 are tightened to lock the outboard support beam 25 onto the inboard support beam 24. Likewise, the nuts 31 are tightened to lock the inboard support beam 24 relative to the prime mover 11. This serves to maintain the appropriate tension in the endless drive members 58 and 59.

It will also be appreciated that the tension in either of the drive members 58 or 59 can also be individually adjusted. For instance, if it is desirable to only adjust the tension in the inboard endless drive member 58, the nuts 31 would be loosened but the bolts 41 would remain tightened. Likewise, if it is desirable to adjust the tension in the outboard endless drive member 59, the bolts 41 would be loosened while the nuts 31 would remain tightened. This greatly simplifies the tension adjustment in the drive members 58 and 59.

To protect the operator, an appropriate cover 60 illustrated by phantom lines in FIGS. 2 and 3 would be provided for the drive assembly 22. Likewise, an appropriate cover 61 is typically provided for the cutting blade 21.

What is claimed as invention is:

1. A saw construction including:
    a prime mover having a rotary output member about a first axis thereon;
    a circular cutting blade;
    support means for rotatably mounting said cutting blade on said prime mover about a second axis spaced from said first axis including a first support member movably mounted on said prime mover for movement along a prescribed adjustment path and a second support member movably mounted on said first support member for movement along said prescribed adjustment path, said second support member mounting said cutting blade thereon; drive means drivingly connecting said output member with said cutting blade to rotate same, said drive means including an intermediate transfer member mounted on said first support member for movement therewith, a first flexible endless drive member drivingly connecting said output member to said transfer member, and a second flexible endless drive member drivingly connecting said transfer member to said cutting blade; and
    tensioning means for simultaneously adjusting the tension in both said first and second endless drive members by moving said second support member with respect to said prime mover so that said second endless drive member moves said transfer member and said first support member to simultaneously tension both said first and second endless drive members.

2. The saw construction of claim 1 further including locking means for releasably affixing said first support member with respect to said prime mover and for releasably affixing said second support member with respect to said first support member.

3. The saw construction of claim 1 wherein said tensioning means includes a base member affixed to said second support member and adjustment means threadedly engaging said base member and adapted to engage said prime mover so that rotation of said adjustment means varies the distance between said prime mover and said base member.

4. The saw construction of claim 1 wherein said tensioning means includes a base tab affixed to said second support member, a support tube mounted on said base tab and extending toward said prime mover, a plunger slidably mounted in said tube and adapted to engage said prime mover, and an adjustment member threadedly extending through said base tab into said tube to engage said plunger so that rotation of said adjustment member axially moves said plunger to vary the distance between said base tab and said prime mover.

5. The saw construction of claim 1 wherein said output member is a V-belt pulley; wherein said transfer member is a double sheave V-belt pulley and wherein said first and second drive members are V-belts.

6. The saw construction of claim 2 wherein said tensioning means includes a base member affixed to said second support member and adjustment means threadedly engaging said base member and adapted to engage said prime mover so that rotation of said adjustment means varies the distance between said prime mover and said base member.

7. The saw construction of claim 6 wherein said tensioning means includes a base tab affixed to said second support member, a support tube mounted on said base tab and extending toward prime mover, a plunger slidably mounted in said tube and adapted to engage said prime mover, and an adjustment member threadedly extending through said base tab into said tube to engage said plunger so that rotation of said adjustment member axially moves said plunger to vary the distance between said base tab and said prime mover.

8. The saw construction of claim 7 wherein said output member is a V-belt pulley; wherein said transfer member is a double sheave V-belt pulley and wherein said first and second drive members are V-belts.

* * * * *